(12) United States Patent
Lum

(10) Patent No.: US 6,546,441 B1
(45) Date of Patent: *Apr. 8, 2003

(54) POINT-OF-SALE SYSTEM

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/295,619

(22) Filed: Apr. 20, 1999

Related U.S. Application Data

(63) Continuation-in-part of application No. 08/899,290, filed on Jul. 23, 1997, now Pat. No. 5,895,452, which is a continuation of application No. 08/350,587, filed on Dec. 6, 1994, now abandoned, which is a continuation of application No. 08/011,461, filed on Jan. 26, 1993, now abandoned.

(51) Int. Cl.[7] ............................ G06F 13/00; G06F 3/00; G06F 13/38; G06F 17/60
(52) U.S. Cl. ............................ 710/72; 710/2; 710/15; 710/17; 710/18; 710/29; 710/36; 710/51; 710/62; 710/63; 710/126; 710/129; 705/16; 705/21; 709/223; 709/224; 709/253
(58) Field of Search ............................ 705/16, 21, 25, 705/43, 44; 710/2–3, 8–12, 15–19, 29, 36–40, 51, 52, 59, 62–65, 72–74, 101–105, 126, 129, 268; 709/102–103, 208, 245, 220–226, 252–253

(56) References Cited

U.S. PATENT DOCUMENTS

| 3,898,373 A | 8/1975 | Walsh |
| T948,012 I4 | 7/1976 | Bouknecht et al. |
| 4,181,936 A | 1/1980 | Kober |
| 4,304,001 A | 12/1981 | Cope |
| 4,387,425 A | 6/1983 | El-Gohary |

(List continued on next page.)

Primary Examiner—Jeffrey Gaffin
Assistant Examiner—Tanh Nguyen
(74) Attorney, Agent, or Firm—Hoffmann & Baron, LLP

(57) ABSTRACT

A point-of-sale system is disclosed which is freely configurable with a plurality of peripheral input devices. The system includes a general purpose computer having a communications port for receiving and/or transmitting data. An electronic interface is coupled to the communications port and readily connectable to the plurality of peripheral input devices for communicating data between the plurality of input devices and the computer. The plurality of peripheral input devices can be selectively connected and disconnected from the electronic interface, the electronic interface maintaining a continuous dialogue with the computer during the connection and disconnection of the input devices.

41 Claims, 12 Drawing Sheets

U.S. PATENT DOCUMENTS

| | | | |
|---|---|---|---|
| 4,443,866 A | | 4/1984 | Burgiss, Sr. |
| 4,484,273 A | | 11/1984 | Stiffler et al. |
| 4,516,201 A | | 5/1985 | Warren et al. |
| 4,547,850 A | | 10/1985 | Genma |
| 4,626,844 A | | 12/1986 | Mann et al. |
| 4,641,266 A | | 2/1987 | Walsh |
| 4,688,171 A | | 8/1987 | Selim et al. |
| 4,742,484 A | | 5/1988 | Yanai et al. |
| 4,817,037 A | | 3/1989 | Hoffman et al. |
| 4,852,043 A | | 7/1989 | Guest |
| 4,862,353 A | | 8/1989 | Williams |
| 4,935,720 A | | 6/1990 | Kalfoun |
| 4,941,084 A | * | 7/1990 | Terada et al. ............... 709/104 |
| 4,972,463 A | | 11/1990 | Danielson et al. |
| 5,018,066 A | | 5/1991 | Yagi |
| 5,090,013 A | * | 2/1992 | Fadem ...................... 370/449 |
| 5,119,294 A | | 6/1992 | Tanaka |
| 5,128,862 A | | 7/1992 | Mueller |
| 5,165,024 A | | 11/1992 | Sweazey |
| 5,179,375 A | * | 1/1993 | Dick et al. ............. 340/825.51 |
| 5,218,527 A | | 6/1993 | Ishikawa et al. |
| 5,235,509 A | | 8/1993 | Mueller et al. |
| 5,249,270 A | * | 9/1993 | Stewart et al. ............. 370/451 |
| 5,313,664 A | | 5/1994 | Sugiyama et al. |
| 5,317,693 A | * | 5/1994 | Cuenod et al. ............. 370/257 |
| 5,371,859 A | | 12/1994 | Lennartsson |
| 5,396,267 A | * | 3/1995 | Bouton ...................... 345/156 |
| 5,396,417 A | * | 3/1995 | Burks et al. ................ 340/825 |
| 5,410,650 A | | 4/1995 | Sasaki et al. |
| 5,438,607 A | | 8/1995 | Przygoda, Jr. et al. |
| 5,444,847 A | | 8/1995 | Iitsuka |
| 5,446,846 A | | 8/1995 | Lennartsson |
| 5,510,979 A | | 4/1996 | Moderi et al. |
| 5,535,336 A | | 7/1996 | Smith et al. |
| 5,539,390 A | * | 7/1996 | Nagano et al. ........ 340/825.52 |
| 5,576,706 A | * | 11/1996 | Daigle et al. .................. 341/22 |
| 5,784,581 A | * | 7/1998 | Hannah ...................... 710/110 |
| 5,809,070 A | * | 9/1998 | Krishnan et al. ........... 375/222 |
| 5,841,424 A | * | 11/1998 | Kikinis ....................... 345/168 |
| 5,890,015 A | * | 3/1999 | Garney et al. ................ 710/62 |
| 5,895,452 A | * | 4/1999 | Lum ........................... 705/16 |
| 5,956,523 A | * | 9/1999 | Chen ......................... 370/466 |
| 5,987,532 A | * | 11/1999 | Tokui .................... 340/825.52 |
| 5,991,830 A | * | 11/1999 | Beard et al. ................... 710/18 |
| 6,044,428 A | * | 3/2000 | Rayabhari ................... 710/129 |
| 6,061,089 A | * | 5/2000 | Tonkin et al. ............... 348/212 |
| 6,101,570 A | * | 8/2000 | Neumyer .................... 710/240 |
| 6,196,456 B1 | * | 3/2001 | Taylor ........................ 235/379 |
| 6,216,188 B1 | * | 4/2001 | Endo et al. ................. 710/103 |
| 6,251,014 B1 | * | 6/2001 | Stockdale et al. ............ 463/16 |
| 6,286,060 B1 | * | 9/2001 | DiGiorgio et al. ............ 710/31 |
| 6,312,175 B1 | * | 11/2001 | Lum .......................... 400/472 |

* cited by examiner

POINT-OF-SALE SYSTEM

CROSS-REFERENCE TO RELATED APPLICATIONS

This application is a continuation-in-part of co-pending U.S. application Ser. No. 08/899,290, filed on Jul. 23, 1997 (now U.S. Pat. No. 5,895,452), which is continuation of U.S. application Ser. No. 08/350,587, filed on Dec. 6, 1994, now abandoned, which in turn is a file wrapper continuation of U.S. application Ser. No. 08/011,461, filed on Jan. 26, 1993, now abandoned.

BACKGROUND OF INVENTION

1. Field of the Invention

The present invention relates to an apparatus for a Point-of-Sale (POS) system where the peripheral input devices are connected to a communications port of a general purpose personal computer.

More specifically, the present invention relates to an improved Point-of-Sale (POS) system utilizing a conventional computer and wherein all peripheral input devices are connected in a daisy chain configuration and can be easily inserted or removed from the system.

2. Description of the Prior Art

In the past, most point-of-sale (POS) systems were integrated or "closed" systems where the failure of any one element would require the entire system to be shut down for replacement of the defective element or in the more serious case, the entire system would need to be replaced. These "closed" systems utilize input device"similar to those of the present invention. Typical peripheral input devices are bar code readers, credit card readers, i.e. magnetic stripe readers, POS keypads, electronic scales, etc. Moreover, these computers and peripheral devices were designed as dedicated systems so that generic, off the shelf components could not be utilized as replacements.

In general, different input devices have different interface requirements. Thus input device #1 may be directly connected to the computer keyboard port while input device #2 may require an interface box or circuit to convert its built-in output data format to RS232 data format. Other input devices may require an internal interface card to convert their built-in output format to a data format that is compatible with the computer. The major problems associated with this type of traditional interface are: 1) Each input device requires a hardware interface card or box; and, 2) Each input device requires a software identification number and interrupt number for the computer to address and communicate with the device. As a result, higher hardware costs and more physical space is required as each input device is added to the system. In addition, the added software requirement for each input device requires software changes to be made every time an input device is changed.

In addition to the above-mentioned short falls of the conventional "closed" system, should a particular input device become outdated or obsolete, the entire system will require changing in order to support the new input device. Thus, updating "closed" systems is wasteful, impractical and uneconomical. Moreover, updating closed systems often causes useful and operating components of the system to be replaced when they are still functional but can only be used with the integrated system.

Conventionally, a typical desk top personal computer has two RS232 communications ports and a lap top computer has only one RS232 port. With the addition of a special plug-in card, a personal computer may be expanded to support up to four RS232 ports. Recently, a new interface called the Universal Serial Bus (USB) has been adopted by the personal computer industry. However, the USB has several drawbacks, including:

(1) non-compatibility with the current RS232 standard, both in hardware and in software; and (2) in order to support more than one peripheral USB device, an expensive hub is required. Moreover, each hub can only drive four USB devices.

Accordingly, there remains a need in the field of point-of-sale systems for an alternative connection configuration which allows a plurality of peripheral input devices to efficiently communicate with a general purpose computer.

It is therefore a goal of one embodiment of the present invention to provide an efficient and flexible point-of-sale (POS) system, which allows peripheral input devices to be freely integrated with or removed from the POS system.

It is a another goal of the present invention to provide a point-of-sale system which allows an unlimited number of peripheral input devices, interconnected in a serial daisy chain configuration, to be coupled to and communicate with a general purpose computer.

It is another purpose of another embodiment of the present invention to provide a point-of-sale system which utilizes an active electronic interface for coupling the input devices to the general purpose computer.

It is yet another goal of one embodiment of the present invention to provide a point-of-sale system whereby peripheral input devices, such as optical scanners, credit card readers, POS keyboards, electronic scales, etc., can be easily inserted or removed from the system without shutting down the computer or reconfiguring the system software or hardware, thereby reducing system down-time.

It is still a further goal of one embodiment of the present invention to provide a point-of-sale system where the failure of one or more peripheral input devices will not impede the operation of the system or other input devices.

SUMMARY OF THE INVENTION

The foregoing needs, purposes and goals are satisfied in accordance with the present invention which, in one embodiment, provides a point-of-sale (POS) system including a general purpose computer capable of running applications software for controlling the POS system and having a communications port, such as a keyboard, RS232, Universal Serial Bus (USB), parallel port, or any other suitable port for transferring data. The POS system further includes a plurality of peripheral input devices, interconnected in a serial daisy chain configuration and coupled to the communications port of the computer.

Preferably, each input device has a built-in electronic wedge interface operatively connecting the peripheral device to either the computer communications port or to another peripheral device. A multiplexer included in the wedge interface selectively provides a pass-through connection, whereby other devices connected to the interface can freely transfer data to the computer, or the multiplexer may electrically disconnect peripheral devices connected to the wedge and allow the corresponding peripheral device to communicate with the computer. The wedge interface further includes electronic circuitry which converts the data format of the corresponding peripheral device into a data format compatible with the computer.

In a preferred embodiment in accordance with the present invention, all peripheral input devices are connected, in a daisy chain configuration, to a keyboard input port of a general purpose computer. Each input device has a built-in electronic wedge interface for keyboard device emulation. Each of these input devices can be used singly with the computer, or with other input devices. Since all input data appear to the computer keyboard port as keyboard data, no software changes are required as input devices are added or deleted. Moreover, no additional computer interface cards are required to support additional peripheral input devices. Thus, the components of the system of the present invention can be easily updated or removed from the system without disturbing the other components of the system.

In an alternative embodiment of the present invention, the peripheral input devices are connected in a daisy chain configuration to an RS232 port of the general purpose computer. Each input device has a built-in electronic wedge interface which converts the data format of the peripheral input device to RS232 format for compatibility with the RS232 port of the computer.

Still a further preferred embodiment of the present invention provides an apparatus for serially connecting a plurality of peripheral input devices to a communications port of a general purpose computer. The host computer includes a computer executable software program for controlling a first interface, a second interface and a plurality of corresponding peripheral devices. The host computer executes the software program and assigns a unique identification code to each of the peripheral devices.

In this embodiment the interface further incudes memory which stores the uniqe identification code, which is operatively connected to a corresponding microprocessor. The microprocessor utilizes the unique identification code to compare with an address recieved with data from the computer, to determine if it is the intended recipient of data transmitted by the computer. The microprocessor causes the corresponding peripheral device to execute the transmitted data if the unique identification code matches the transmitted address. The apperatus includes a plurality of such interfaces, being operatively connected in a daisy chain configuration to the interface input, such that the first peripheral input device is operatively connected to an interface input of a last interface of said daisy chain.

These and other purposes, goals and advantages of the present invention will become apparent from the following detailed description of illustrative embodiments thereof, which is to be considered in connection with the accompanying drawings. It is to be understood, however, that the drawings are designed as an illustration only, and not as a definition of the limits of the invention.

BRIEF DESCRIPTION OF THE DRAWINGS

In the drawings, wherein similar reference characters denote similar elements throughout the several views.

DETAILED DESCRIPTION OF THE PREFERRED EMBODIMENTS

Figure 1:
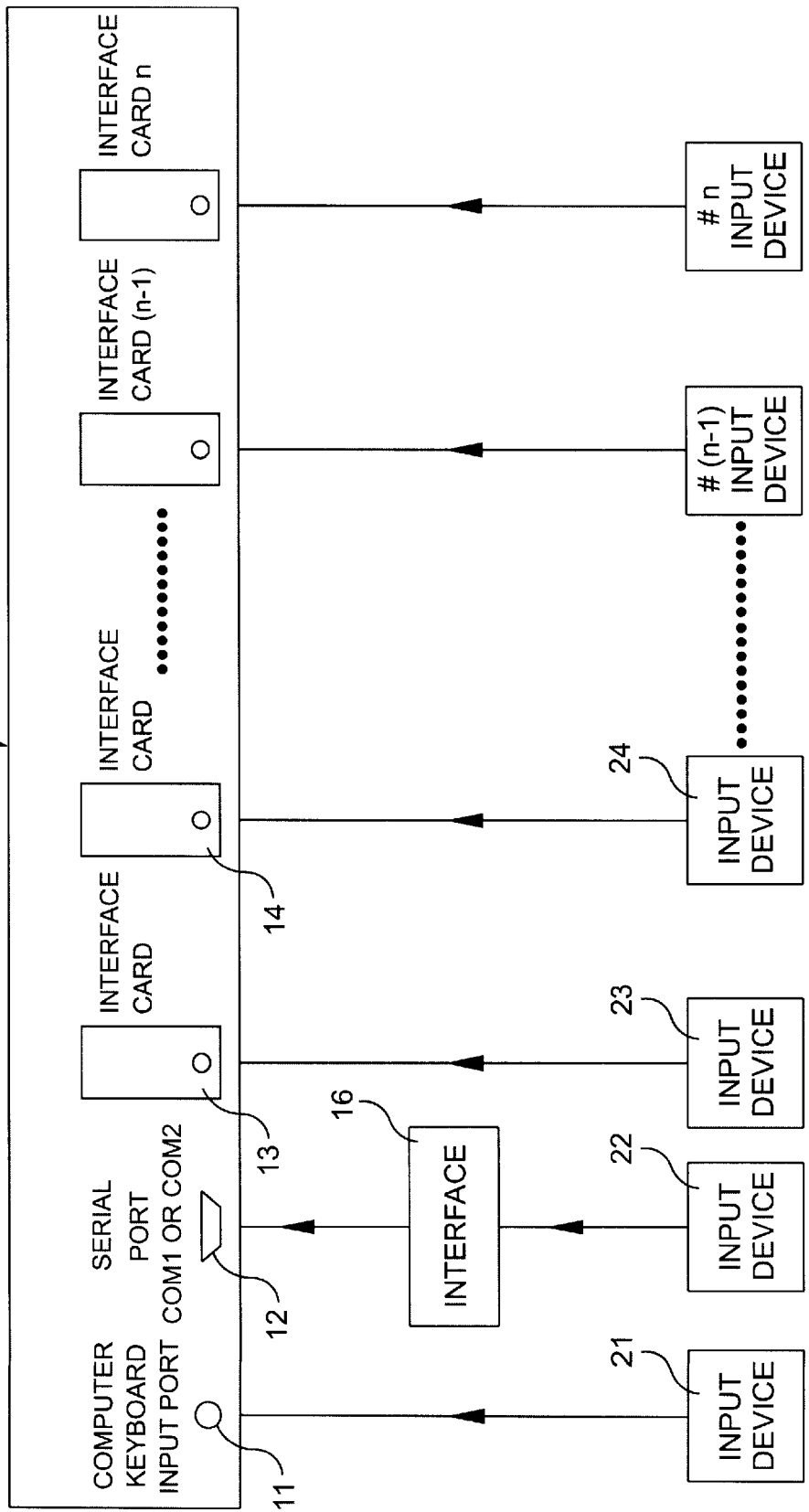
FIG. 1 is a block diagram of a conventional point-of-sale system.

Referring now in detail to FIG. 1, there is shown a prior art point-of-sale system comprising a general purpose computer 10 with a plurality of input devices/peripherals 21, 22, 23, 24 . . . , n−1 and n connected to computer 10. Input device 21, for example, a standard keyboard, is connected to computer 10 through the computer keyboard input port 11. Input device 22 is connected to the serial port 12 of computer 10. A separate interface 16 is required for input device 22 to communicate with computer 10. Input devices 23 and 24 interface with computer 10 by means of internal interface card 13 and 14 respectively. Additional input devices would require their own separate interface cards. Thus each input device requires a different interface with computer 10. Furthermore, the number of input devices is limited by the number of slots available on computer 10 to receive interface cards. In addition, adding or removing internal interface cards requires partial disassembly of computer 10, reconfiguration of the software, and re-booting the system. These prior art systems are known as "closed" systems since peripherals cannot be readily integrated or removed from the system.

Figure 2:
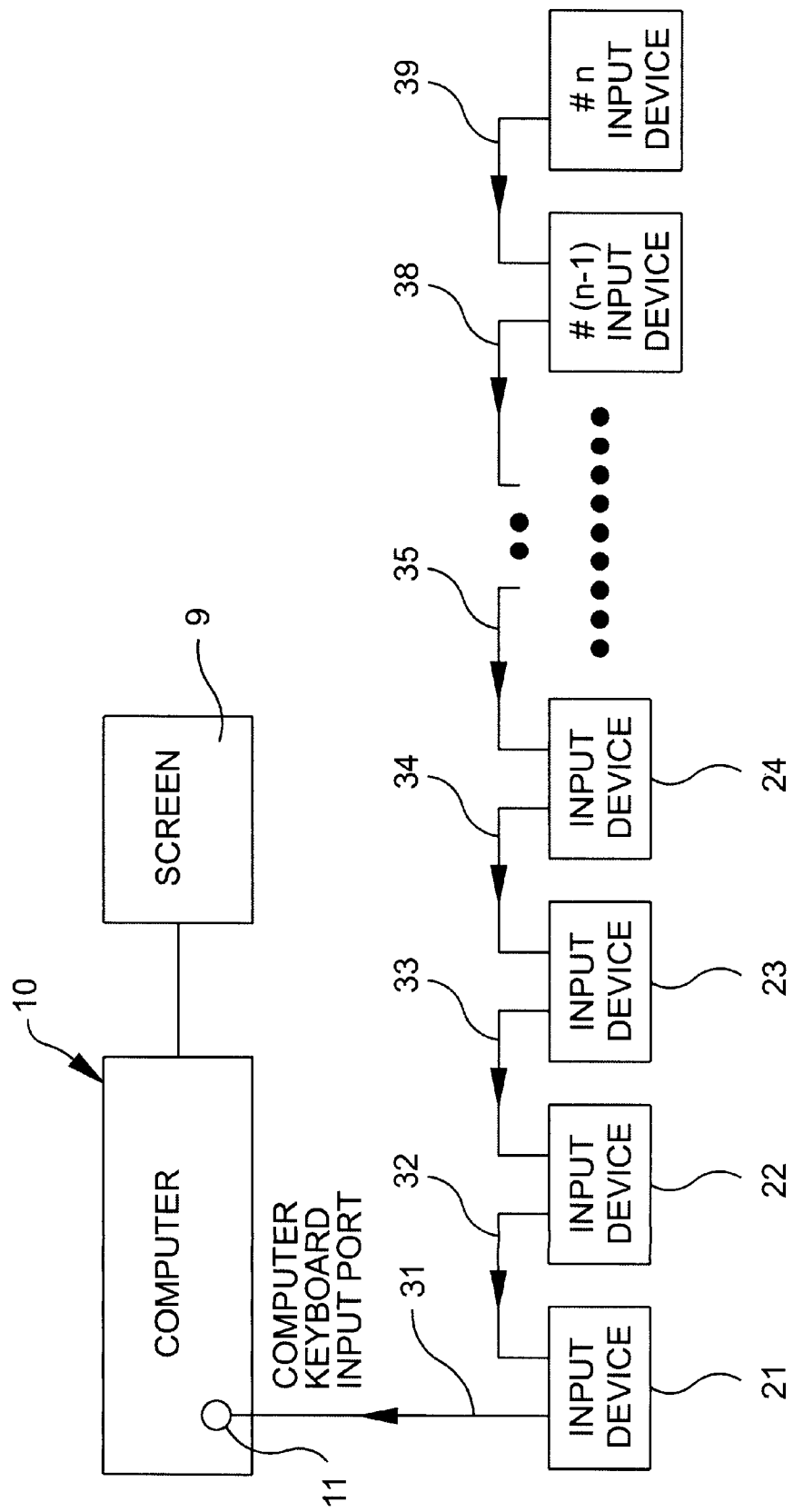
FIG. 2 is a block diagram of a point-of-sale system formed in accordance with one embodiment of the present invention.

Referring now to FIG. 2, there is shown a point-of-sale system formed in accordance with one embodiment of the present invention. The point-of-sale system preferably includes a display screen 9 and a plurality of peripheral input devices 21, 22, 23, 24 . . . , n−1 and n, connected in a daisy chain configuration to each other by means of cables 31–35, . . . 38 and 39. Cable 31 preferably couples input devices 21-n to computer 10 via a computer keyboard input port 11, although any communications port may be employed and is similarly contemplated by the present invention. The input devices can be freely integrated or removed from the system by coupling or uncoupling their respective cables.

Most of the input devices preferably provide a pass-through connection which allows other input devices to communicate directly with computer 10. For example, while input device 23 is communicating with computer 10, input devices 21 and 22 are preferably configured as passive, with the signal from input device 23 simply by-passing input devices 21 and 22. If input device 22 has data to be sent to computer 10, it preferably monitors the pass-through communication on lines 33 and 32 and waits for a break. Input device 22 then preferably electrically disconnects line 33 (thus disabling input devices 23-n) and transmits its data along cable 32. While input device 22 is communicating with computer 10, input device 21 maintains the pass-through connection, i.e. essentially an internal electrical coupling of cables 31 and 32.

Once input device 22 has completed transmitting its data, it subsequently electrically re-connects cables 32 and 33, bringing input devices 23-n back on-line and allowing any of the input devices to transmit data to computer 10. It should be noted that, with the point-of-sale system of the present invention, damage to or failure of any of the input devices will not necessarily cause a general system failure. For example, if input device 23 malfunctioned, as long as the pass-through connections of cables 33 and 34 were maintained, the remaining input devices will function normally.

Figure 3:
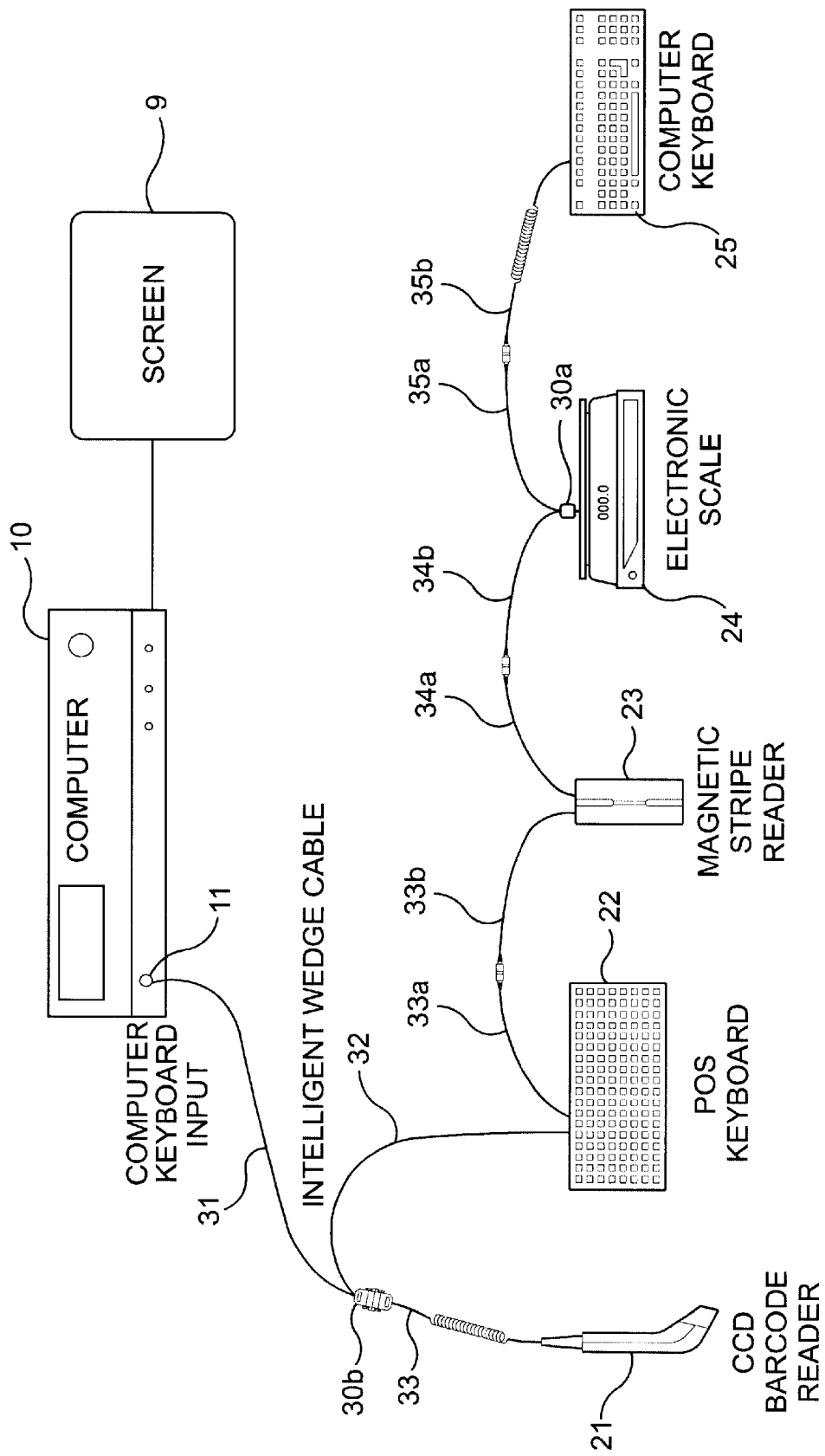
FIG. 3 is a diagram illustrating one example of the point-of-sale system of the present invention, including a general purpose computer and related point-of-sale peripheral devices.

FIG. 3 illustrates a preferred embodiment of a point-of-sale system according to the present invention. As shown in FIG. 3, the point-of-sale system preferably includes a display screen 9 and specific peripheral input devices connected in a daisy chain configuration to the keyboard input port 11 of computer 10. The system further includes point-of-sale applications software, executable by computer 10, for controlling the point-of-sale system. Computer keyboard 25 is preferably connected by cables 35a, 35b to an electronic scale 24 which is equipped with an interface 30a. Electronic scale 24 is then preferably connected by cables 34a, 34b to magnetic stripe reader 23. Magnetic stripe reader 23 is preferably connected to a point-of-sale keypad or keyboard 22, also by means of cables 33a, 33b. An optical scanner, preferably a CCD bar code reader 21, is preferably connected to the point-of-sale keyboard 22 via cable 33, an interface 30b and cable 32. Interface 30b is preferably connected to the keyboard input port 11 of computer 10 through cable 31. The point-of-sale software program preferably includes a programmable look-up table (LUT) corresponding to POS keyboard 22 for correlating the keys on POS keyboard 22 to a particular item and its associated price.

Since input devices 21–25 are preferably connected to the keyboard input port 11 of the computer 10, each input device preferably transmits data in standard keyboard format in order to be understood by (i.e., compatible with) computer 10, which expects standard keyboard formatted data through the keyboard port 11. However, different input devices may have differing interface requirements. Thus, while one peripheral device may output its data in standard keyboard format, another input device may require a conversion circuit to convert its output data into keyboard format. POS keyboard 22, and similarly magnetic stripe reader 23 and computer keyboard 25, for example, preferably have a built-in electronic wedge interface circuit. Bar code reader 21 and electronic scale 24, for example, have different output formats, such as RS232 data format or OCIA format, which may be converted to standard keyboard format by interface 30a or 30b. Therefore, all input devices preferably transmit standard keyboard formatted data to the keyboard input port 11 of the computer 10.

An important advantage of the point-of-sale system of the present invention shown in FIG. 3 is the overlap of various input functions (i.e., redundancy of functions). POS keyboard 22, for example, preferably contains a full alphanumeric key set (i.e., A–Z and 0–9) such that it can perform the same functions as computer keyboard 25. Therefore if POS keypad 22 or computer keyboard 25 failed, the functioning keypad or keyboard could still be used to enter information. Each key of POS keypad 22 may represent a string of up to 15 characters and is preferably fully programmable. Furthermore, if magnetic stripe reader 23 fails to operate, the credit card information may be alternately fed to computer 10 through POS keypad 22 or computer keyboard 25. If CCD bar code reader 21 fails to operate, the numerical representation of the bar code data could be entered through POS keypad 22 or computer keyboard 25.

Due to these redundant functions, failure of a peripheral component need not interrupt the processing of a given customer. If magnetic stripe reader 23 failed while trying to read credit card data, the information could simply be entered on POS keypad 22 while a new magnetic stripe reader is exchanged for the defective magnetic stripe reader.

A further advantage of the point-of-sale system is that a basic system, for example a general purpose computer, a computer keyboard and point-of-sale software, could be purchased initially. Peripheral components, for example a bar code reader, POS keypad, magnetic stripe reader and/or electronic scale, could then be purchased and added to the system at a later date as the user's needs expand. Adding additional peripherals would not require a reconfiguration of software or hardware; they could simply be plugged in. It should also be noted that POS keypad 22, magnetic stripe reader 23 or electronic scale 24 may be connected directly to keyboard input port 11, for example, through cables 32, 33b and 34b respectively.

Figure 4:
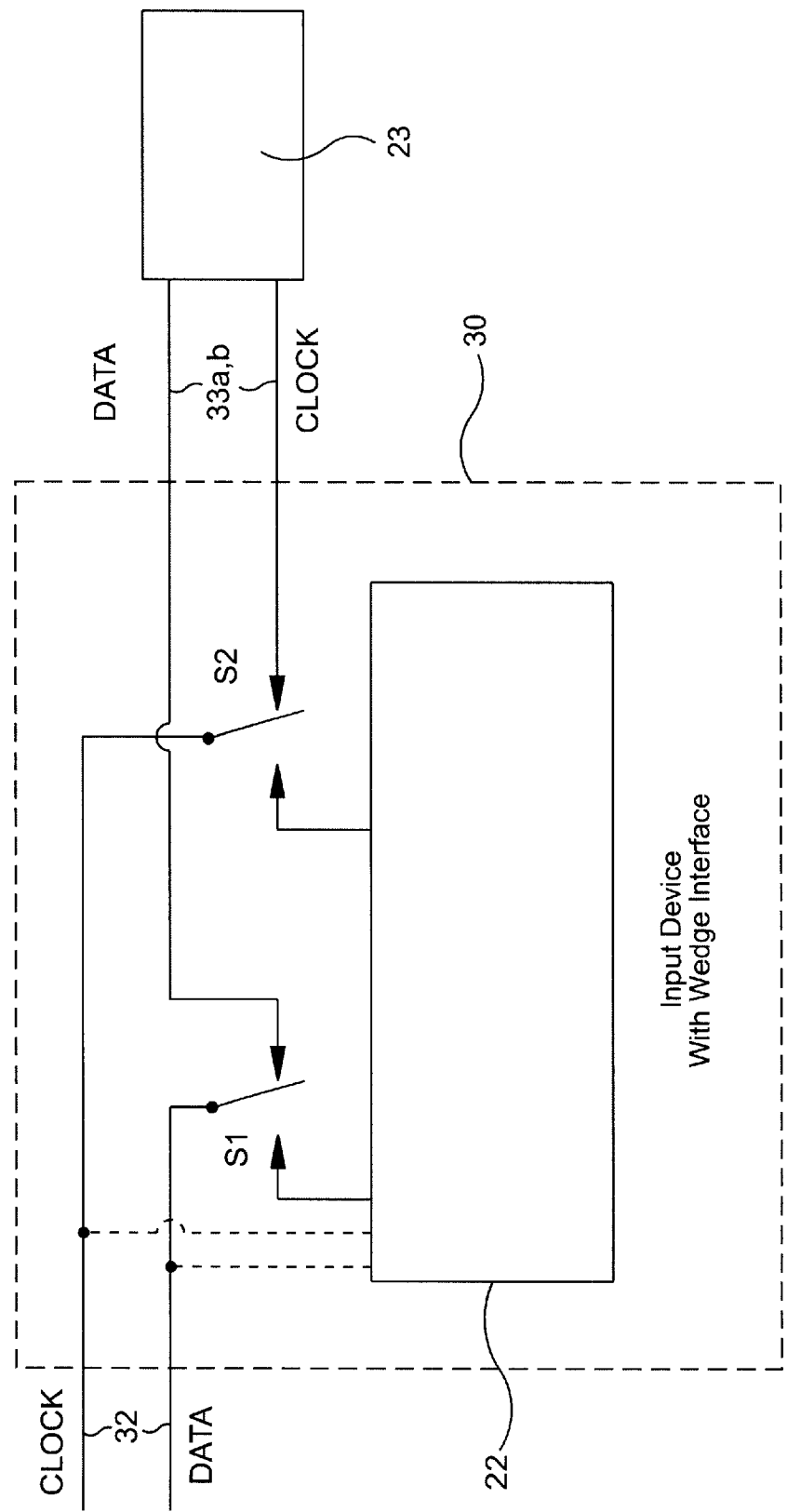
FIG. 4 is a block diagram of a wedge interface device, formed in accordance with the present invention, internally integrated with a point-of-sale input device.

With reference now to FIG. 4, there is shown the basic structure of an internal interface circuit 30 integrated, for example, with input device 22. It is similarly contemplated that interface circuit 30 may be integrated with any input device in the POS system. Interface circuit 30 is shown functionally as including a pair of switches, S1 and S2, preferably coupled to magnetic stripe reader 23, or other peripheral input device, via cables 33a, 33b and to other "upstream" peripheral devices (i.e., input devices that are connected closer to the computer in the serial daisy chain) via cable 32. The switches S1, S2 may be either in a pass-through state (default), as shown, or in a transmit state.

As the name suggests, an input device 22 configured with the switches S1, S2 in the pass-through state basically functions as a conduit through which data freely passes, thereby allowing other "downstream" input devices (i.e., input devices that are connected further away from the computer in the serial daisy chain) to communicate directly with the computer. When the switches S1, S2 are in the transmit state, all downstream devices (e.g., input device 23) that are connected to the particular input device (e.g., input device 22) are electrically disconnected from cable 32 and are thus effectively prevented from transmitting data to the computer.

During normal operation, switches S1 and S2 of interface 30 are in the pass-through state, as shown in FIG. 4, thereby allowing magnetic stripe reader 23, or other downstream input devices to then communicate with computer 10 as if POS keyboard 22 were not present.

Before POS keyboard 22 transmits data, interface 30 preferably first checks the availability of the clock and data lines for transmission, thus avoiding possible bus contention. If the lines are free, switches S1 and S2 are placed in the transmit state, essentially disconnecting input device 23 and other downstream input device(s) connected to input device 23 and allowing POS keyboard 22 to transmit clock and data information to computer 10. When the lines are busy, interface 30 preferably stores the data from the input device until the lines are available for communication with the computer. Once the lines are free, switches S1 and S2 are placed in the transmit state to allow data from the input device to be transmitted to computer 10. If multiple input devices are present, each having their own interface circuit 30, each interface circuit 30 will preferably independently store and monitor the clock and data lines until they are free and then transmit their stored data.

Interface 30 may be configured to convert the data it receives from the input device to which it is attached, for example, RS232 or OCIA format, into keyboard type data so that computer 10 only receives data in standard keyboard format, regardless of the source of the information. As can be seen in FIG. 3, bar code reader 21 and scale 24 are both equipped with external interfaces 30a and 30b, to convert their output into standard keyboard format. In addition, interface 30 permits a peripheral device having a single output connection to be serially connected to other peripherals. Also, interface 30 can be used to convert all data to RS232 format, or any other data format. Thus, all peripheral input devices may be daisy chained together and connected to an interface card within computer 10.

When interface 30 is not transmitting clock and data to computer 10, it preferably monitors and records all activities between keyboard 25 and computer 10. For example, if the "CAPS LOCK" key is depressed, interface 30 will preferably make the proper case inversion such that the computer 10 always receives the correct characters from the input device. The similar monitoring logic also allows the wedge interface to identify and adapt to the type of computer used in the system, e.g. XT, AT, PS/2 model 25 or models 50–90 and compatibles thereof. Interface 30 maintains a continuous dialogue with the computer if the standard keyboard is absent. Therefore, the computer can boot up properly without a "Keyboard Error" even if the standard keyboard and/or input devices are not installed. In other words, interface 30 will communicate with computer 10 allowing the peripherals to be inserted or removed from the system. If a peripheral is present and has data to be transmitted to computer 10, interface 30 will cease communication with computer 10 and allow data to pass from the peripheral through interface 30 to computer 10.

Referring again to FIG. 3, any input device can be removed from the system simply by uncoupling the device from its cable. For example, magnetic stripe reader 23 can be removed from the system by uncoupling cable 33a from cable 33b and uncoupling cable 34a from cable 34b. Cable 33a is then connected to cable 34b, thereby electrically bypassing the desired peripheral device in the serial daisy chain. While the cables are uncoupled, upstream input devices, namely bar code reader 21 and POS keypad 22, will continue to function properly. Thus, failed components can be replaced in a system with minimum downtime or while other components, still coupled to the computer, continue to operate. If all peripherals were removed, interface 30, connected by cable 31 to keyboard input 11, would preferably continue to communicate with computer 10, thus avoiding a "keyboard error." Additional peripherals may be coupled to interface 30 at any time thereafter.

Figure 5:
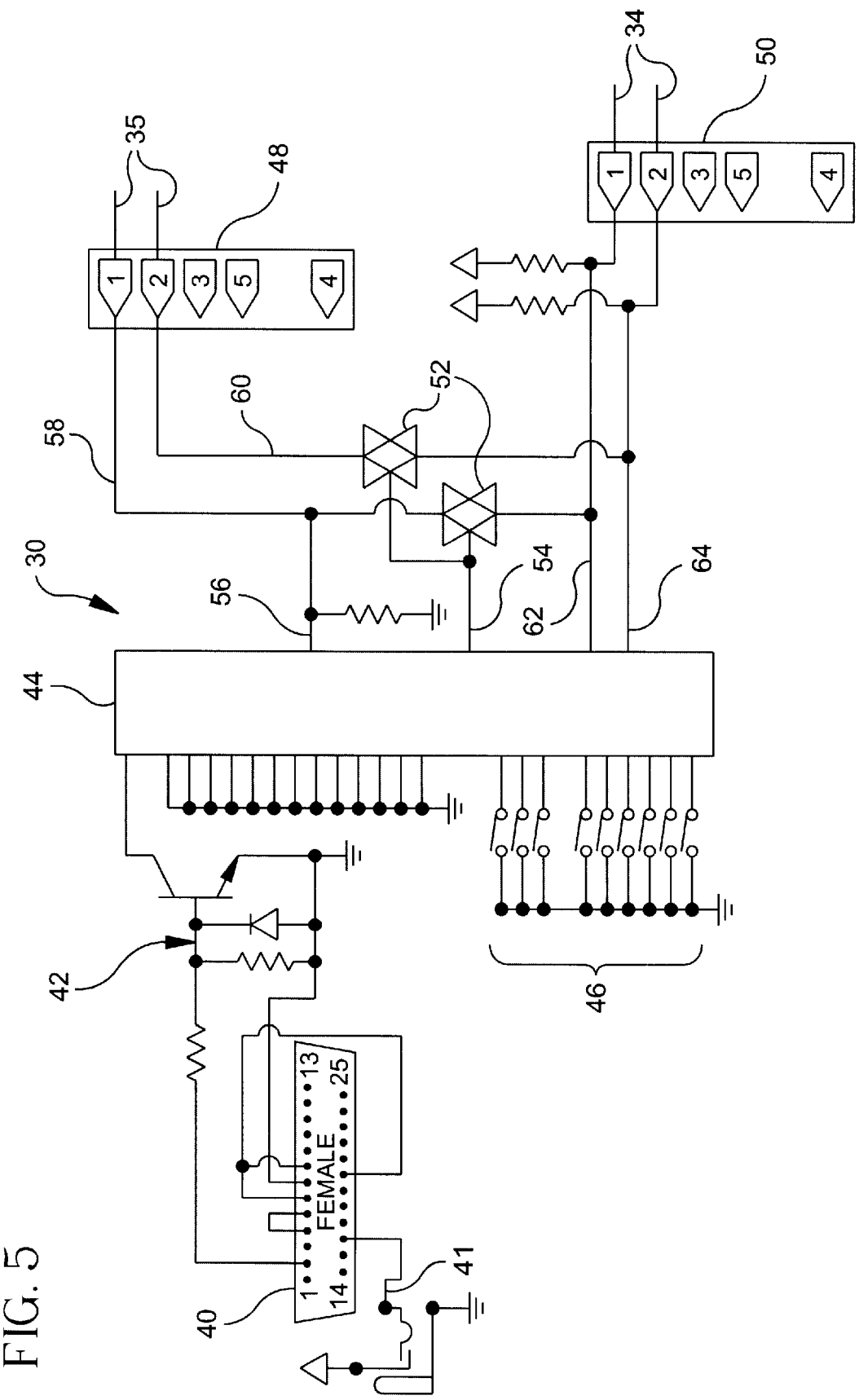
FIG. 5 is an electrical schematic diagram of an exemplary wedge interface circuit, formed in accordance with the present invention and depicted by the block diagram of FIG. 4.

An exemplary wedge interface circuit 30, formed in accordance with the present invention, is illustrated in FIG. 5. As shown in FIG. 5, the interface 30 includes a connector, preferably a 25-pin DB25 connector 40 or equivalent, for operatively coupling the interface circuit 30 with the output of a peripheral device. The signal from the peripheral device is inverted by invertor circuit 42, preferably realized as a general purpose transistor, and presented to microprocessor 44, for example, an 80C51 microcontroller or equivalent. Interface 30 may optionally be powered by a 5 VDC power supply to pin 16 on power line 41. A bank of parameter switches, preferably dual in-line pin (DIP) switches 46, allows the adjustment of various communications parameters, such as baud rate, parity option (e.g., on or off), number of data bits (e.g., 7 or 8), "Num Lock" capability and an auto-discriminate feature that automatically discerns the type of computer attached or allows a default to AT-type.

Interface 30 preferably includes a keyboard input connector 48, such as a 5-pin DIN connector or equivalent. Cable 35 from keyboard 25 is coupled to keyboard input 48. Interface 30 also includes an interface output connector 50, such as a 5-pin DIN connector or equivalent.

Cables 34 are coupled to interface output connector 50. Switches 52 are provided between keyboard input connector 48 and interface output connector 50 and are simultaneously controlled by switch control line 54. Switches 52 may be implemented as a pair of commercially available analog multiplexers or equivalent devices. Microprocessor 44 preferably monitors clock line 58 through monitor line 56. Clock line 58 and data line 60 are connected to microprocessor clock line 62 and microprocessor data line 64, respectively.

Ordinarily, switch control line 54 holds switches 52 closed, directly coupling the keyboard input 48 with the interface output 50. When the peripheral device coupled to connector 40 has information to be transmitted to computer 10, the information is inverted by circuit 42 and preferably stored in memory, preferably embedded in microprocessor 44. Monitor line 56 monitors clock line 58 and when clock line 58 is free, microprocessor 44 directs switch control line 54 to open switches 52. The stored data is then transmitted along microprocessor clock line 62 and microprocessor data line 64 to interface output 50. Since computer 10 preferably receives information in standard keyboard format, it cannot distinguish whether the information is coming from a keyboard or other peripheral device. Thus, keyboard input 48 is coupled to a peripheral, for example keyboard 25, in a pass-through connection to interface output 50. A peripheral which has an output other than standard keyboard format is connected at connector 40.

Any type of peripheral can be connected to microprocessor 44 by proper selection of the connector, conversion circuit and firmware for the microprocessor. In addition, once the peripheral outputs are converted to standard keyboard output, any number of peripherals can be strung together. When another peripheral is operating, the non-operating interfaces simply pass the data through without interference.

Figure 6:
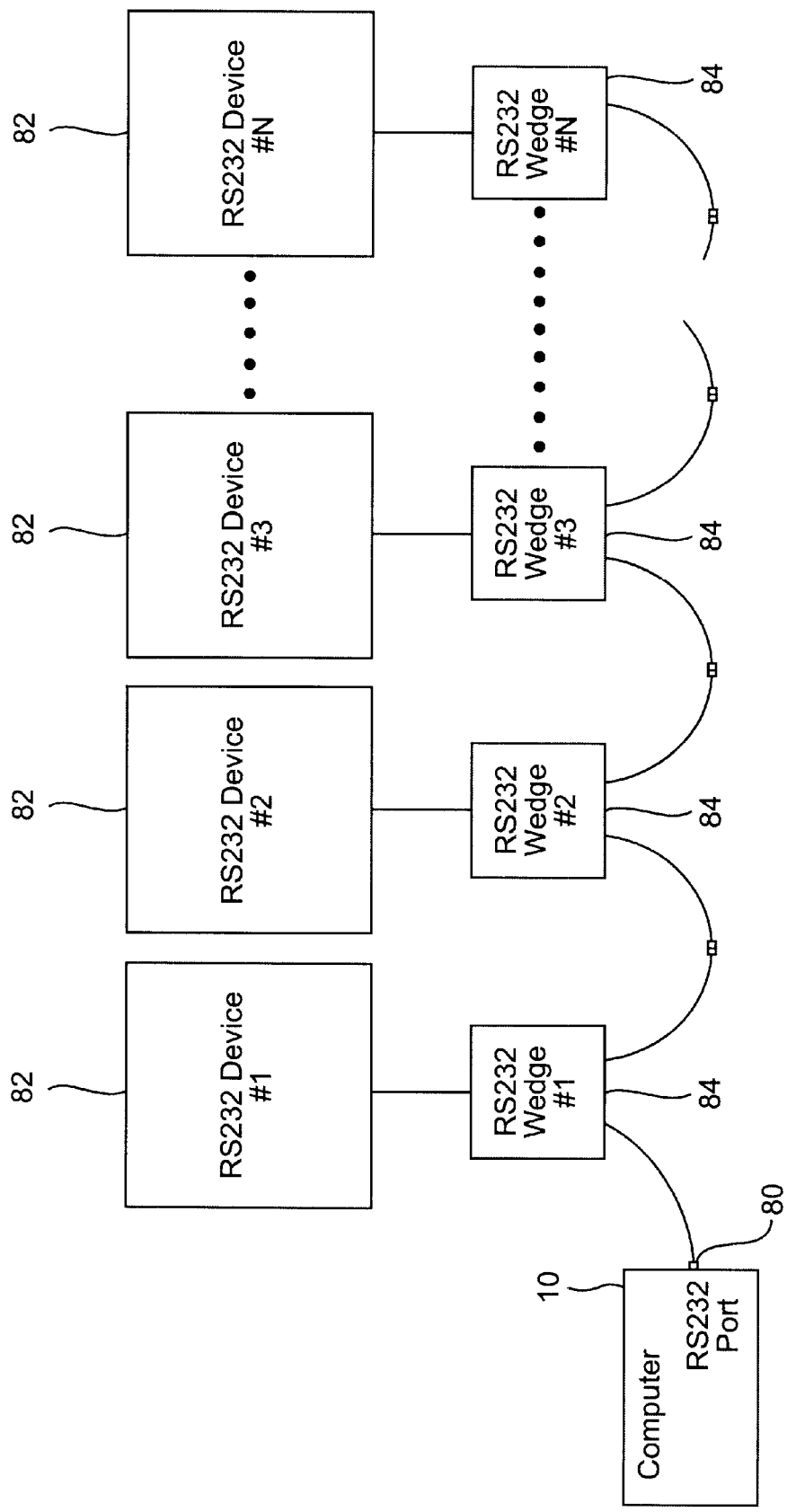
FIG. 6 is a block diagram illustrating a point-of-sale system, formed in accordance with another embodiment of the present invention, in which the plurality of input devices are connected to an RS232 port of a general purpose computer.

In an alternative embodiment of the present invention illustrated in FIG. 6, a plurality of peripheral input devices 82 are preferably connected in a serial daisy chain configuration to an RS232 port 80 of the general purpose computer 10. In a manner similar to that described in detail above, each input device 82 is preferably connected to an intelligent wedge interface circuit 84, which may either be internally integrated with the input device itself or may alternatively be externally connected to the device 82. The wedge interface 84 preferably converts the output data format of the respective input device 82 to RS232 data format, compatible with the RS232 port 80 of the computer 10. In addition, the intelligent wedge interface 84 preferably includes circuitry which uniquely identifies the corresponding peripheral device to which it is coupled. This allows the computer 10 to address specific peripheral devices in the serial daisy chain.

With continued reference to FIG. 6, an exemplary RS232 intelligent wedge device, formed in accordance with the present invention, preferably includes an input, operatively connected to either the RS232 port 80 of the computer 10 (e.g., via a cable with a DB9F connector) or to another upstream peripheral device, an output (e.g., a cable 83 with a DB9M connector) for operatively coupling the interface 84 to a downstream peripheral device, and a peripheral device port 86, preferably a DB25M connector, operatively connected to the corresponding RS232 peripheral device 82.

Preferably, a cable 83 operatively connected to the output of a first wedge interface 84 (e.g., RS232 wedge #1) is coupled to another cable 85 operatively connected to the input of a second wedge interface 84 (e.g., RS232 wedge #2) via a pair of mating connectors, preferably male and female DB9 connectors respectively. In this manner, a plurality of RS232 peripheral devices may be serially daisy chained together. Suitable RS232 peripheral devices may include a serial printer, pole display, cash drawer, and bar code reader.

Typically, the computer 10 executes an application software program for controlling the point-of-sale system. If the computer 10 has data to be transferred to a particular peripheral device, it preferably appends a unique "trap code" or similar identification (ID) code as a header to the data for targeting the desired device. The trap code may be a 2-digit control code such as, for example, !#, @%, etc., although the present invention contemplates various other suitable encoding schemes, as appreciated by those skilled in the art. The device trap codes are preferably chosen so that under normal circumstances, the trap code sequence is not present in the message text. The above example trap codes are preferred since their existence in a typical text data stream will be rare.

Each RS232 wedge 84 in the daisy chain preferably has a unique trap code or ID code associated with it. By way of example, assume a first wedge interface (e.g., wedge #1) is assigned trap code !*, a second wedge interface (e.g., wedge #2) is assigned trap code @%, a third wedge interface (e.g., wedge #3) is assigned trap code *&, and a last wedge interface (e.g., wedge #N) is assigned trap code !#.

The data transmitted by the computer to the peripheral devices preferably includes a header portion and a message portion. In other words, if the computer is to send the message "ABCD" to RS232 Device #2, a preferred message format may be @%ABCD. Since the first wedge interface receives the data first, it examines the header portion of the data to determine if it is the intended recipient of the message. The header @% is an incorrect match with the address for wedge #1. Therefore the entire message @%ABCD is rejected by wedge #1 and passed to the next downstream device in the serial daisy chain. In a similar manner, RS232 wedge #2 subsequently receives the data @% ABCD. It checks the header and finds the correct address match. Wedge #2 then strips the header @% from the received data and sends the message "ABCD" to RS232 device #2.

In a preferred embodiment, upon power up, all RS232 wedge interfaces are initially assigned same header address, for example !#. When electrical power is applied, the application software preferably sends a simple initialization sequence of commands to assign the unique address headers for each wedge device.

For the headers listed above, as an example, the power-on initialization routine may be:

!#8!* (CR)
!#8@% (CR)
!#8*& (CR),
etc., where, !# is the default header address for all wedge devices,
(CR) is the carriage return message terminator, and
8 is the command number to direct the wedge device to change its header address to the 2-digit code that follows.

The above sequence of commands works as follows: The first command !#8!*(CR) received by wedge #1 and accepted because !# matches its power-on default header address. Wedge #1 recognizes the command as header address change command and it modifies the address to !*. When the next command !#8@%(CR) is received, the header address !# is no longer a correct match for wedge #1 because its new address is !*. Therefore wedge #1 will pass the command to the next downstream wedge. When wedge #2 receives this command, it accepts the message because wedge #2's power-on default address is !#. As explained before, wedge #2 changes its header address to @%. When the 3rd command !#8&(CR) is sent out from the computer, both wedge #1 and wedge #2 will reject it because !# is no longer a match for their header addresses. Wedge #3 will receive and accept the 3rd command because its default address matches !#. As explained previously, wedge #3 changes its header address to *&. With N wedge devices, (N−1) commands similar to above are sent from the computer during the power-on initialization period. The last wedge, #N, requires no address change and retains its default address !#.

In another configuration of this invention, all ports are parallel ports instead of serial RS232 ports. The theory of operation for both parallel and serial ports is the same. The parallel wedge devices may also be integrated into the parallel peripheral devices.

It is to be appreciated that with the present invention, communication between peripheral input devices and the computer is not limited to merely standard keyboard data format (i.e., through a keyboard port) or RS232 data format (i.e., through an RS232 port), as illustrated in FIGS. 2 and 6 respectively. Rather, the present invention contemplates communication between the peripheral input devices and the computer by any data communications protocol. As appreciated by those skilled in the art, by simply changing the firmware, for example, of the interface circuit, the communications parameters of the interface circuit may be modified. In this manner, the output data format of the input device to which the interface is connected may be converted to a data format compatible with the particular communications port utilized in the computer.

Figure 7:
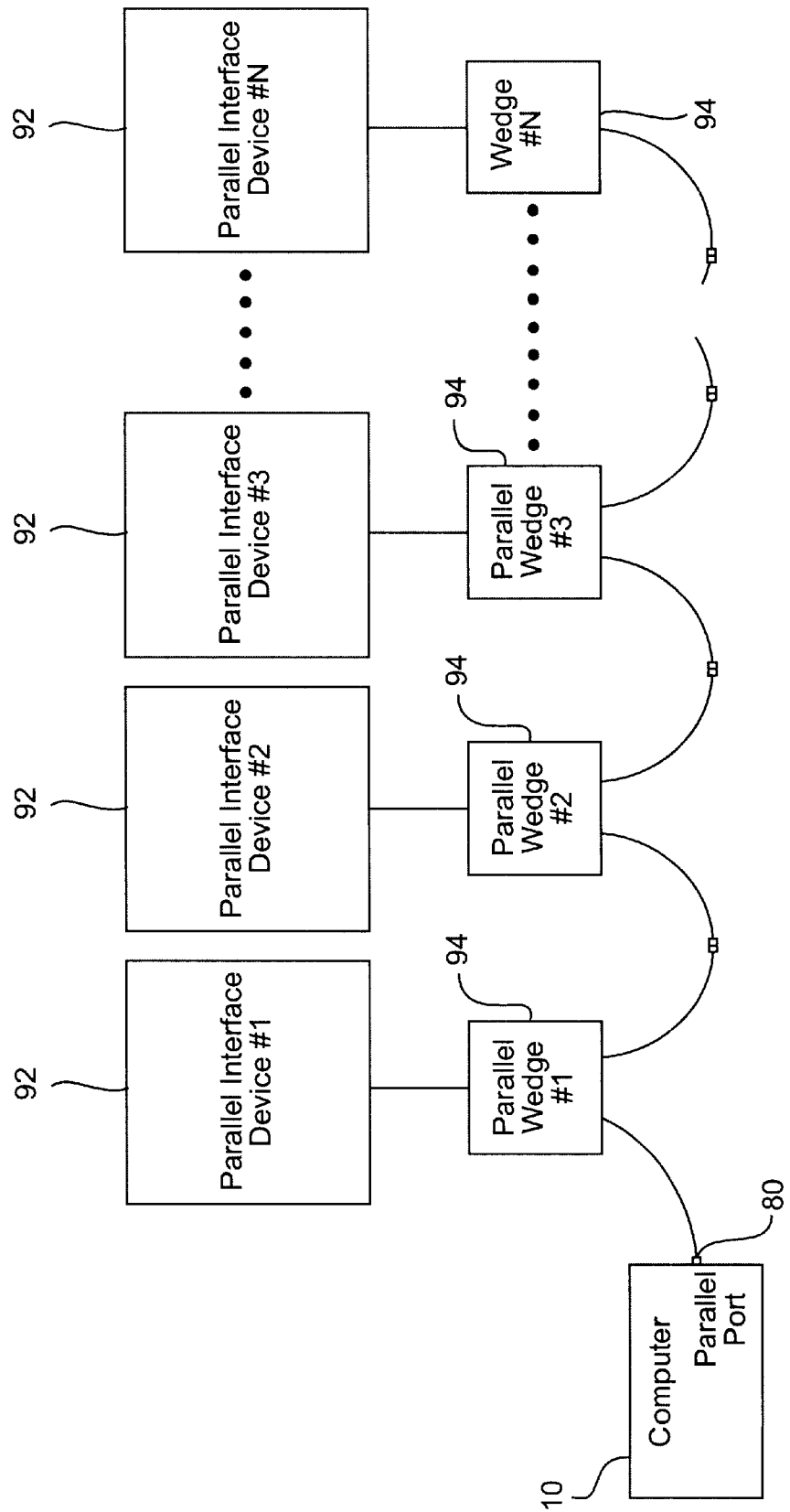
FIG. 7 is a block diagram illustrating a point-of-sale system, formed in accordance with a third embodiment of the present invention, in which the plurality of input devices are connected to a parallel port of a general purpose computer.
Figure 8A:
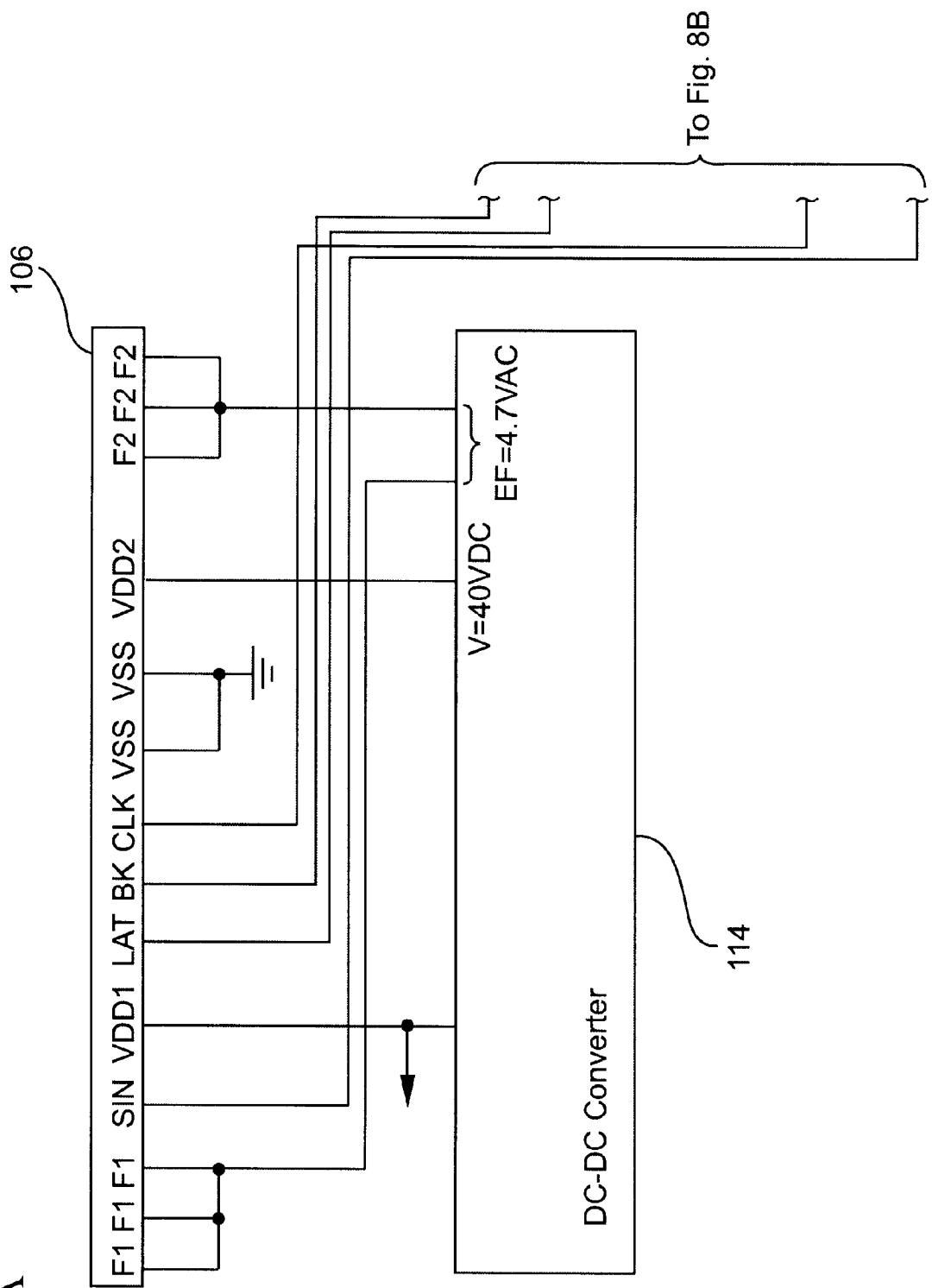
FIG. 8 is an electrical schematic diagram of an exemplary pole display interface circuit, formed in accordance with the present invention.
Figure 8B:
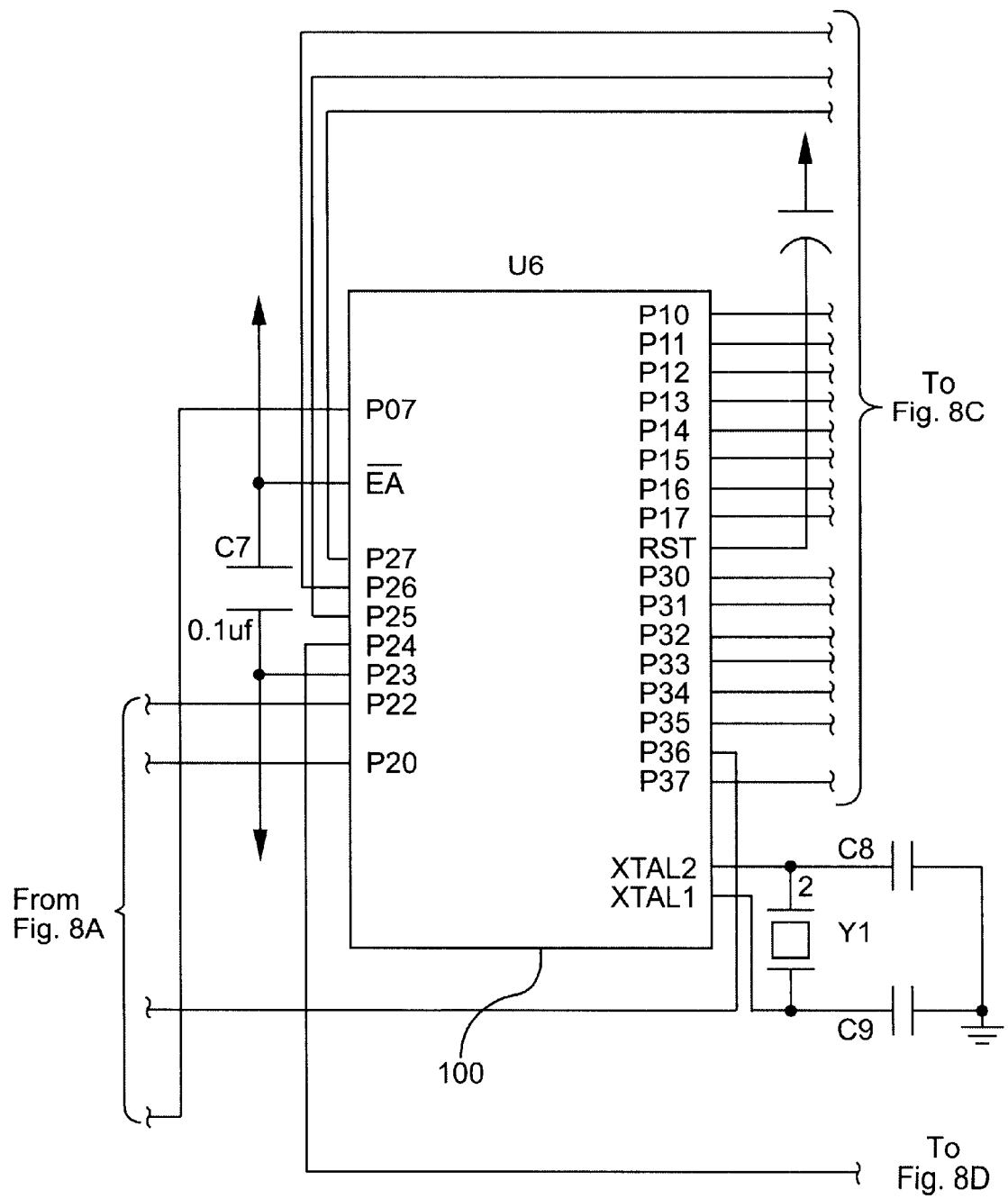
Figure 8C:
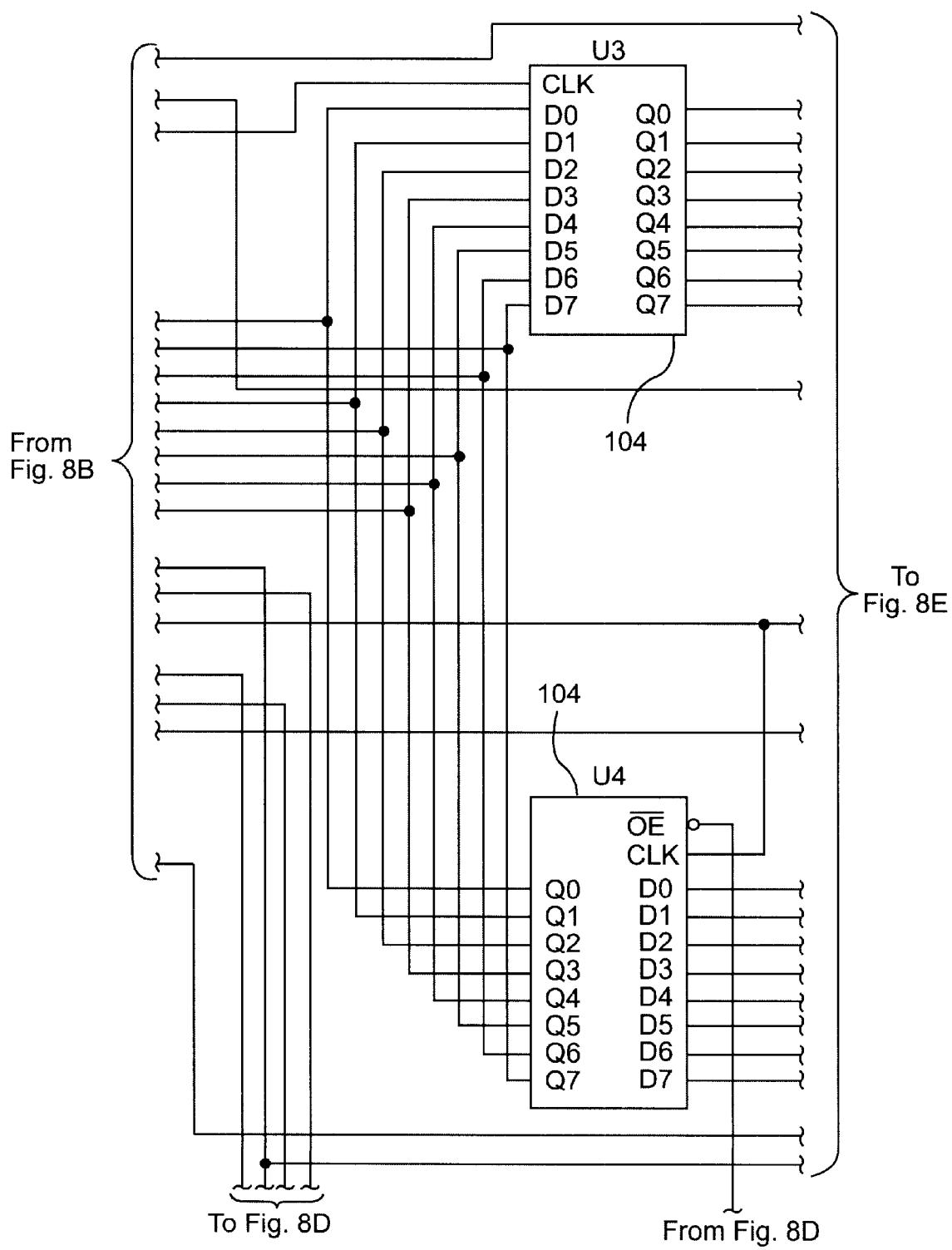
Figure 8D:
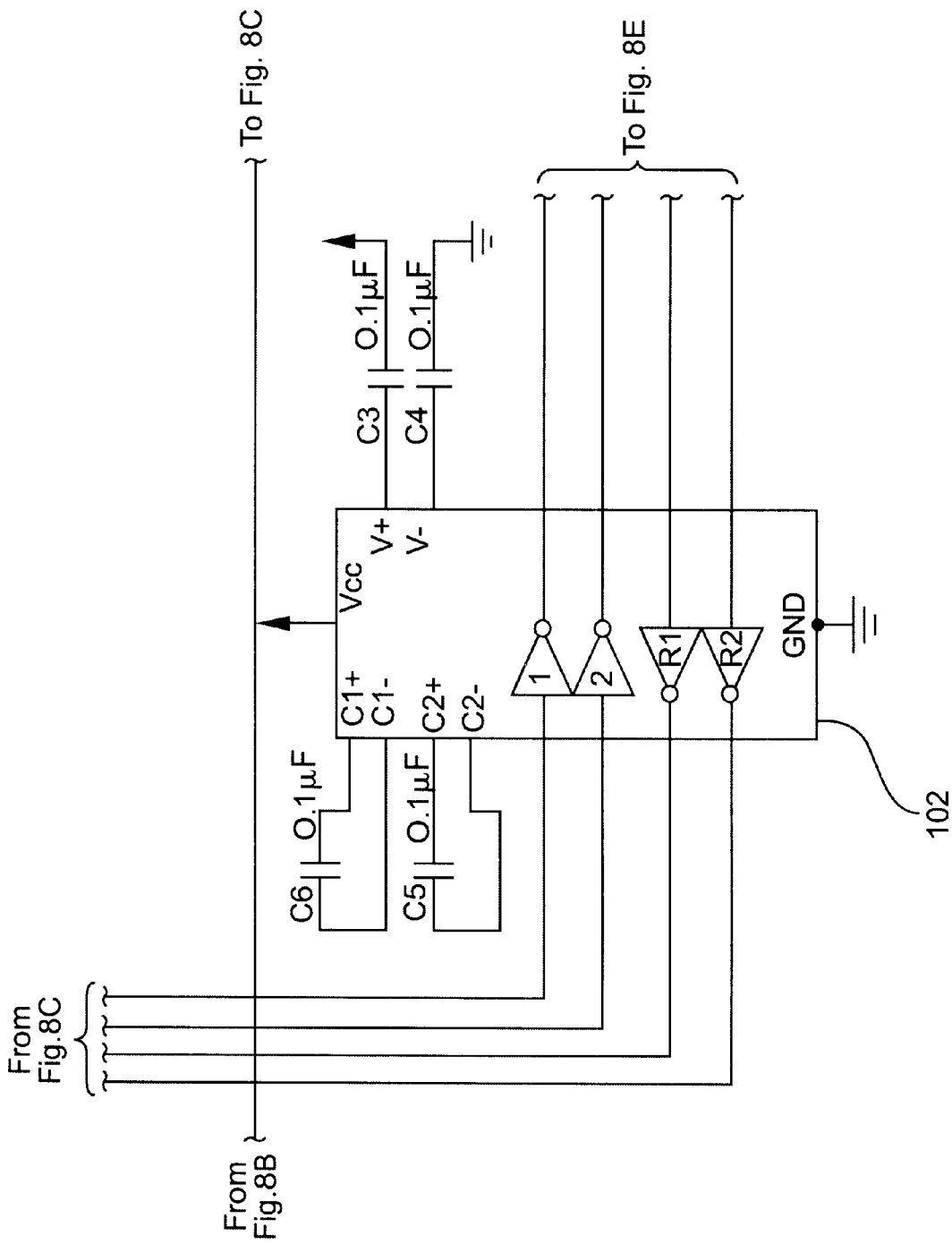
Figure 8E:
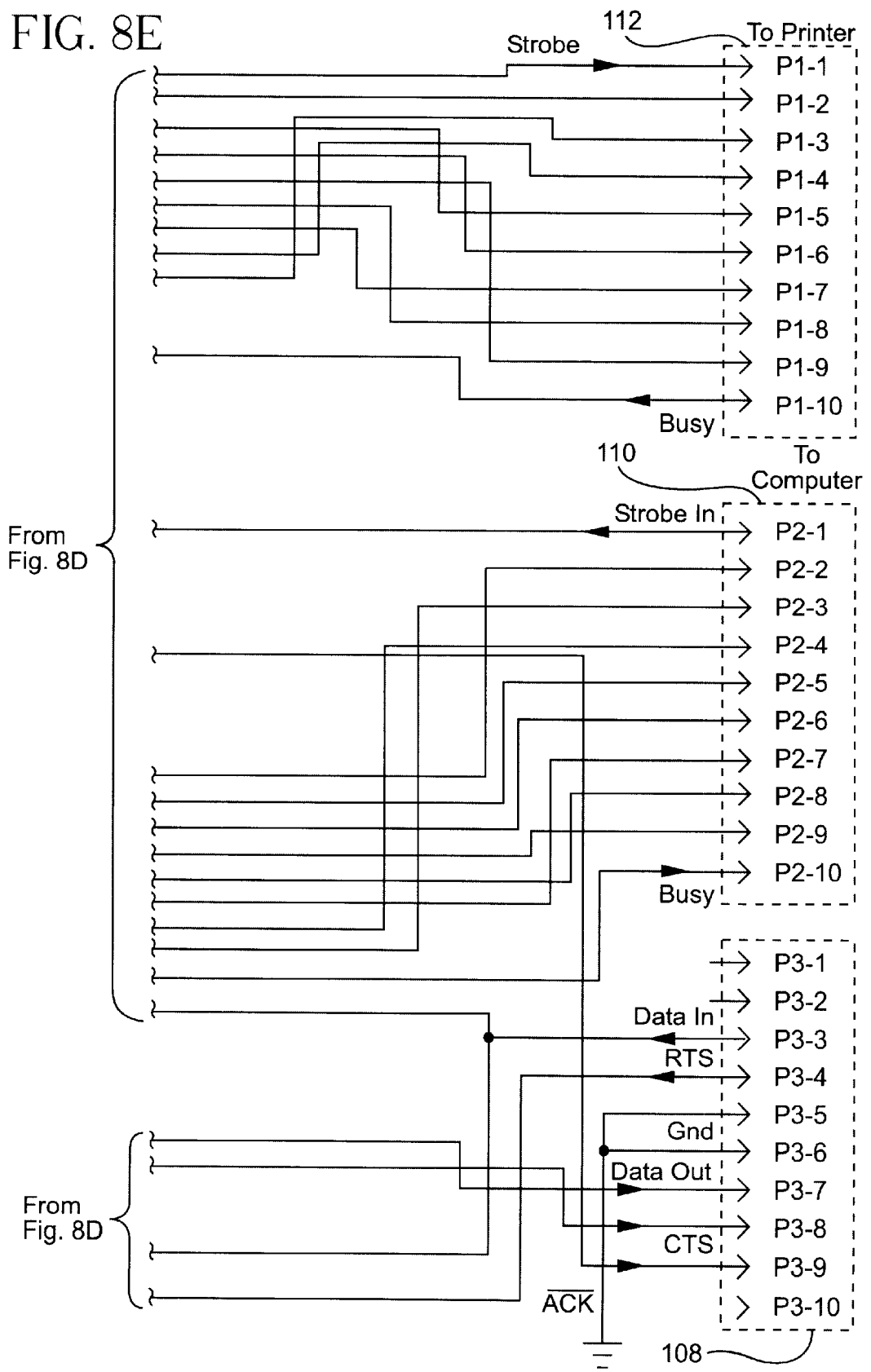

In an alternative embodiment of the present invention, bidirectional communication between the general purpose computer and the plurality of peripheral input devices is contemplated. For example, FIG. 7 illustrates a computer 10 having a parallel port 90. A plurality of peripheral input devices 92 are preferably serially connected in a daisy chain configuration to the parallel port 90 of the computer 10. In order to provide a standard data communications format which is compatable with the parallel port 90, each input device 92 preferably includes an interface circuit 94 which converts the output data format of the input device into parallel data format, as similarly discussed above.

Using a parallel data format may provide important advantages in that it allows bidirectional communication between the computer and the input devices. This may be desirable, for example, when using a POS keyboard input device having re-legendable keys that are individually programmable by the computer, depending on the desired application. A typical parallel input device which may be employed with the point-of-sale system of the present invention includes a pole display, for example model PD3000 manufactured by Logic Controls, Inc., or equivalent.

An exemplary pole display interface circuit, formed in accordance with the present invnetion, is illustrated in the electrical schematic diagram of FIG. 8. As shown in FIG. 8, the pole display interface preferably includes a microcontroller, such as an 80C51 or equivalent, and related peripheral components. The microcontroller 100 preferably has embedded memory for storing application program instructions and for providing additional data storage and retrieval space. It is also contemplated that such memory may reside externally to the microcontroller 100. It will be clear to those skilled in the art that a number of microprocessor circuits and architectures which are suitable for use with the present invention may be employed and are generally well known.

The pole display interface circuit further includes a serial RS232 transceiver 102, such as Maxim Products part number MAX232 or equivalent, functioning as a serial RS232 communications port. The serial transceiver 102 is connected to a serial RS232 connector 108, for operatively coupling the interface circuit to a serial peripheral device. The serial transceiver 102 is operatively connected to the microcontroller 100 and provides a data transfer between the serial peripheral device, attached to serial connector 108, and the microcontroller 100.

A pair of parallel transceivers 104 are preferably included in the pole display interface circuit, each functioning as a parallel communications port and each connected to a corresponding parallel connector 110 and 112. One parallel connector 110 is operatively coupled to the parallel port of the computer and the other parallel connector 112 is operatively coupled to a downstream peripheral device. The parallel transceivers 104 are each operatively connected to the microcontroller 100 and provide data transfer between the microcontroller 100 and either the computer (via connector 110) or a downstream peripheral device attached to connector 112.

The microcontroller 100 is also operatively connected to a display module 106 for displaying information to the user. Power to the display module 106 may be provided internally, for example by a DC-DC converter 114 connected to the display module. Alternatively, power may be provided to the display module 106 externally through a power connector (not shown).

It should be noted that when using a parallel configuration for the connection of the plurality of peripheral devices to the computer, as described herein above, parallel peripheral devices may not be added to or removed from the point-of-sale system without affecting the remaining peripheral devices. For this reason, although the present invention contemplates connecting peripheral devices to the parallel port of the computer, a serial communications protocol is preferred.

It is to be further appreciated that, although the peripheral input devices of the point-of-sale system are described herein as being connected to each other and to the computer via electrical cables or wires, the present invention similarly contemplates wireless data transfer, for example by way of infrared transceivers, optical fiber links, radio telemetry, or other suitable data transfer topologies and configurations.

By way of example (with reference again to FIG. 3), during normal operation, computer 10 executes the POS application software, for example, a "check-out" program. During the "check-out" routine, computer 10 typically prompts the cashier for the SKU label of a piece of merchandise. As a response to the prompt, the cashier may scan the SKU label with the CCD bar code reader 21. Interface 3b then converts the CCD bar code reader output to standard keyboard format, which computer 10 then accepts through its keyboard input port 11. Alternatively, the cashier may press a key on POS keypad 22, weigh an item on scale 24, or enter an SKU manually on keyboard 25. The output data from peripheral input devices 22, 23, 24 or 25, for example, may be converted to standard keyboard format, in accordance with the present invention, by either an internal or external interface. The converted data is then transmitted to keyboard input port 11 in a compatible format.

When the POS software running on computer 10 is prompting for payment, the cashier would enter the amount tendered by the customer through the computer keyboard 25 or the POS keypad 22. Alternatively, if the customer wishes to pay by credit card, the POS software would prompt the cashier to read the customer's credit card. Using magnetic stripe reader 23, computer 10 receives data through keyboard input port 11 and interprets the data as credit card information and processes it accordingly.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An apparatus for serially connecting a plurality of peripheral input devices to a general purpose computer, said apparatus including an interface comprising:

an interface input and an interface output, said interface output being operatively connected to the computer and said interface input being operatively connected to a first peripheral input device;

a peripheral device port operatively connecting a second peripheral input device to said interface;

a microprocessor operatively connected to said interface input, said microprocessor monitoring data communications between the computer and said first peripheral input device, said microprocessor generating a signal in accordance with traffic conditions on the serial connection between the computer and the peripheral input devices, said signal having a first value indicative of the occurrence of said data communications between said computer and said first peripheral input device, said signal having a second value indicative of the computer being available for data communication with said second peripheral input device when there is no traffic on the serial connection between the computer and the peripheral input devices; and, a multiplexer operatively connected between said interface input and said interface output, and selectively providing an electrical connection between said interface input, said interface output and said peripheral device port, said multiplexer having a control input operatively connected to said microprocessor and being responsive to said signal from the microprocessor, said multiplexer performing one of the following functions:

(i) when said signal is at said first value, directing data received from said interface input directly to said interface output without requiring the data to pass through the microprocessor; and, (ii) when said signal is at said second value, directing data received from said peripheral device port to said interface output.

2. An apparatus according to claim 1, further including a second interface comprising:
- an interface input and an interface output, said interface output of the second interface being operatively coupled to the interface input of said interface, and said interface input of the second interface being operatively connected to said first peripheral input device;
- a peripheral device port operatively connecting a third peripheral input device to said second interface,
- a microprocessor operatively connected to said interface input of the second interface, said microprocessor of the second interface monitoring data communications between the computer and said first peripheral input device, said microprocessor of the second interface generating a signal in accordance with traffic conditions on the serial connection between the computer and the peripheral input devices, said signal from the microprocessor of the second interface having a first value indicative of the occurrence of said data communications between said computer and said first peripheral input device, said signal from the microprocessor of the second interface having a second value indicative of when there is no traffic on the serial connection between the computer and the peripheral input devices the computer being available for data communication with said third peripheral input device; and,
- a multiplexer operatively connected between said interface input of the second interface and said interface output of the second interface, and selectively providing an electrical connection between said interface input of the second interface, said interface output of the second interface and said peripheral device port of the second interface, said multiplexer of the second interface having a control input operatively connected to said microprocessor of the second interface and being responsive to said signal from the microprocessor of the second interface, said multiplexer of the second interface performing one of the following functions:
  - (i) when said signal from the microprocessor of the second interface is at said first value, directing data received from said interface input of the second interface directly to said interface output of the second interface without requiring the data to pass through the microprocessor of the second interface; and,
  - (ii) when said signal from the microprocessor of the second interface is at said second value, directing data received from said peripheral device port of the second interface to said interface output of the second interface.

3. An apparatus according to claim 1, wherein said multiplexer maintains electrical connection between said interface input and said interface output until said signal is at said second value, wherein said multiplexer directs data communication between said second peripheral input device and the computer.

4. An apparatus according to claim 3, wherein said multiplexer re-establishes electrical connection between said interface input and said interface output after said second peripheral input device has completed said data communication with the computer.

5. An apparatus according to claim 2, wherein said multiplexer in said second interface maintains electrical connection between said interface input of the second interface and said interface output of the second interface until said signal from the microprocessor of the second interface is at said second value, wherein said multiplexer in said second interface directs data communication between said third peripheral input device and the computer.

6. An apparatus according to claim 5, wherein said multiplexer in said second interface re-establishes electrical connection between said interface input of the second interface and said interface output of the second interface after said third peripheral input device has completed said data communication with the computer.

7. An apparatus according to claim 1, wherein said interface further comprises memory, operatively connected to said microprocessor, said microprocessor storing data received from said second peripheral input device in said memory when the computer is communicating with said first peripheral input device, said microprocessor transmitting said data stored in said memory when the computer is available for communicating with said second peripheral input device, thereby avoiding bus contention.

8. An interface according to claim 2, wherein said second interface further comprises memory, operatively connected to said microprocessor of the second interface, said microprocessor of the second interface storing data received from said third peripheral input device in said memory of the second interface when the computer is communicating with said first peripheral input device, said microprocessor of the second interface transmitting said data stored in said memory of the second interface when the computer is available for communicating with said third peripheral input device, thereby avoiding bus contention.

9. An apparatus according to claim 2, further comprising:
- a conversion circuit for converting data received from said second peripheral input device in a first predetermined format to a second predetermined format, said second format being compatible with said general purpose computer.

10. An apparatus according to claim 9, further comprising:
- a second conversion circuit for converting data received from said third peripheral input device in a third predetermined format to said second predetermined format for communicating with said general purpose computer.

11. An apparatus according to claim 9, wherein said second predetermined format is RS232 format.

12. An apparatus according to claim 10, wherein said second predetermined format is RS232 format.

13. An apparatus according to claim 2, further comprising a plurality of said interfaces operatively connected in a daisy chain configuration to said interface input, wherein said first peripheral input device is operatively connected to an interface input of a last interface of said daisy chain.

14. An apparatus according to claim 7, wherein said memory is located in said microprocessor.

15. An apparatus according to claim 8, wherein said memory is located in said microprocessor of the second interface.

16. An apparatus according to claim 1, wherein said plurality of peripheral input devices are selected from the group consisting of an optical scanner, a point-of-sale keyboard, a magnetic stripe reader, an electronic scale and a computer keyboard.

17. An apparatus according to claim 2, wherein at least one of said first peripheral input device, said second peripheral input device, and said third peripheral input device is selected from the group consisting of an optical scanner, a point-of-sale keyboard, a magnetic stripe reader, an electronic scale and a computer keyboard.

18. An apparatus according to claim 1, wherein said plurality of peripheral input devices are operatively connected to a keyboard input port of the general purpose computer.

19. An apparatus according to claim 1, wherein said plurality of peripheral input devices are operatively connected to an RS232 port of the general purpose computer.

20. An apparatus for serially connecting a plurality of peripheral input devices to a communications port of a general purpose computer, said apparatus including an interface comprising:
- an interface input and an interface output, said interface output being operatively connected to the computer and said interface input being operatively connected to a first peripheral input device;
- a peripheral device port operatively connecting a second peripheral input device to said interface;
- a microprocessor operatively connected to said interface input, said microprocessor monitoring data communications between the computer and said first peripheral input device, said microprocessor generating a signal in accordance to with traffic conditions on the serial connection between the computer and the peripheral input devices, said signal having a first value indicative of the occurrence of said data communications between said computer and said first peripheral input device, said signal having a second value indicative of when there is no traffic on the serial connection between the computer and the peripheral input devices the computer being available for data communication with said second peripheral input device; and,
- a multiplexer operatively connected between said interface input and said interface output, and selectively providing an electrical connection between said interface input, said interface output and said peripheral device port, said multiplexer having a control input operatively connected to said microprocessor and being responsive to said signal from the microprocessor, said multiplexer performing one of the following functions:
  (i) when said signal is at said first value, directing data received from said interface input directly to said interface output without requiring the data to pass through the microprocessor; and,
  (ii) when said signal is at said second value, directing data received from said peripheral device port to said interface output.

21. An apparatus according to claim 20, further including a second interface comprising:
- an interface input and an interface output, said interface output of the second interface being operatively coupled to the interface input of said interface, and said interface input of the second interface being operatively connected to said first peripheral input device;
- a peripheral device port operatively connecting a third peripheral input device to said second interface,
- a microprocessor operatively connected to said interface input of the second interface, said microprocessor of the second interface monitoring data communications between the computer and said first peripheral input device, said microprocessor of the second interface generating a signal in accordance with traffic conditions on the serial connection between the computer and the peripheral input devices, said signal from the second interface having a first value indicative of the occurrence of said data communications between said computer and said first peripheral input device, said signal from the second interface having a second value indicative of the computer being available for data communication with said third peripheral input device when there is no traffic on the serial connection between the computer and the peripheral input devices; and,
- a multiplexer operatively connected between said interface input of the second interface and said interface output of the second interface, and selectively providing an electrical connection between said interface input of the second interface, said interface output of the second interface and said peripheral device port of the second interface, said multiplexer of the second interface having a control input operatively connected to said microprocessor of the second interface and being responsive to said signal from the microprocessor of the second interface, said multiplexer of the second interface performing one of the following functions:
  (i) when said signal from the microprocessor of the second interface is at said first value, directing data received from said interface input of the second interface directly to said interface output of the second interface without requiring the data to pass through the microprocessor of the second interface; and,
  (ii) when said signal from the microprocessor of the second interface is at said second value, directing data received from said peripheral device port of the second interface to said interface output of the second interface.

22. An apparatus according to claim 20, wherein said multiplexer maintains electrical connection between said interface input and said interface output until said signal is at said second value, wherein said multiplexer directs data communication between said second peripheral input device and the computer.

23. An apparatus according to claim 22, wherein said multiplexer re-establishes electrical connection between said interface input and said interface output after said second peripheral input device has completed said data communication with the computer.

24. An apparatus according to claim 21, wherein said multiplexer in said second interface maintains electrical connection between said interface input of the second interface and said interface output of the second interface until said signal from the microprocessor of the second interface is at said second value, wherein said multiplexer in said second interface directs data communication between said third peripheral input device and the computer.

25. An apparatus according to claim 24, wherein said multiplexer in said second interface re-establishes electrical connection between said interface input of the second interface and said interface output of the second interface after said third peripheral input device has completed said data communication with the computer.

26. An apparatus according to claim 20, further comprising a computer executable software program for controlling said interface and said plurality of peripheral input devices, wherein the computer executes said software program and assigns a unique identification code to each of said plurality of peripheral devices, and
- wherein said interface further comprises memory which stores said unique identification code, said memory being operatively connected to said microprocessor which utilizes said unique identification code to compare with an address received with data from the computer, to determine if it is the intended recipient of data transmitted by the computer, and causes the corresponding peripheral device to execute the transmitted data if the unique identification code matches said address, and
- wherein said microprocessor stores data received from said second peripheral input device in said memory when the computer is communicating with said first peripheral input device, and wherein said microprocessor transmits said data stored in said memory when the computer is available for communicating with said second peripheral input device, thereby avoiding bus contention.

27. An interface according to claim 21, further comprising a computer executable software program for controlling said interface, said second interface and said plurality of peripheral input devices, wherein the computer executes said software program and assigns a unique identification code to each of said plurality of peripheral devices, and wherein said interface further comprises memory which stores said unique identification code, said memory being operatively connected to said microprocessor in the interface which utilizes said unique identification code to compare with an address received with data from the computer, to determine if it is the intended recipient of data transmitted by the computer, and causes the corresponding peripheral device to execute the transmitted data if the unique identification code matches said address, and wherein said second interface further comprises memory which stores said unique identification code, said memory of the second interface being operatively connected to said microprocessor in said second interface which utilizes said unique identification code to compare with an address received with data from the computer, to determine if it is the intended recipient of data transmitted by the computer, and causes the corresponding third peripheral device to execute the transmitted data if the unique identification code matches said address, and wherein said memory of the second interface is operatively connected to said microprocessor of the second interface, said microprocessor of the second interface storing data received from said third peripheral input device in said memory of the second interface when the computer is communicating with said first peripheral input device, said microprocessor of the second interface transmitting said data stored in said memory of the second interface when the computer is available for communicating with said third peripheral input device, thereby avoiding bus contention.

28. An apparatus according to claim 21, further comprising:

a conversion circuit for converting data received from said second peripheral input device in a first predetermined format to a second predetermined format, said second format being compatible with said general purpose computer.

29. An apparatus according to claim 28, further comprising:

a second conversion circuit for converting data received from said third peripheral input device in a third predetermined format to said second predetermined format for communicating with said general purpose computer.

30. An apparatus according to claim 28, wherein said second predetermined format is RS232 format.

31. An apparatus according to claim 29, wherein said second predetermined format is RS232 format.

32. An apparatus according to claim 21, further comprising a computer executable software program for controlling said interface, said second interface and said plurality of peripheral input devices, wherein the computer executes said software program and assigns a unique identification code to each of said plurality of peripheral devices, and wherein said interface further comprises memory which stores said unique identification code, said memory being operatively connected to said microprocessor which utilizes said unique identification code to compare with an address received with data from the computer, to determine if it is the intended recipient of data transmitted by the computer, and causes the corresponding peripheral device to execute the transmitted data if the unique identification code matches said address, and wherein said second interface further comprises memory which stores said unique identification code, said memory of the second interface being operatively connected to said microprocessor in said second interface which utilizes said unique identification code to compare with an address received with data from the computer, to determine if it is the intended recipient of data transmitted by the computer, and causes the corresponding third peripheral device to execute the transmitted data if the unique identification code matches said address, and wherein said apparatus further comprises a plurality of said interfaces operatively connected in a daisy chain configuration to said interface input, wherein said first peripheral input device is operatively connected to an interface input of a last interface of said daisy chain.

33. An apparatus according to claim 26, wherein said memory is located in said microprocessor.

34. An apparatus according to claim 27, wherein said memory is located in said microprocessor of the second interface.

35. An apparatus according to claim 20, wherein at least one of said first peripheral input device and said second peripheral input device is selected from the group consisting of an optical scanner, a point-of-sale keyboard, a magnetic stripe reader, an electronic scale and a computer keyboard.

36. An apparatus according to claim 21, wherein said plurality of peripheral input devices are selected from the group consisting of an optical scanner, a point-of-sale keyboard, a magnetic stripe reader, an electronic scale and a computer.

37. An apparatus according to claim 20, wherein said plurality of peripheral input devices are operatively connected to a keyboard input port of the general purpose computer.

38. An apparatus according to claim 20, wherein said plurality of peripheral input devices are operatively connected to an RS232 port of the general purpose computer.

39. An apparatus according to claim 32, wherein said computer executes a power-on initialization routine whereby said unique identification codes are assigned to at least one of said plurality of peripheral input devices.

40. An apparatus according to claim 1, wherein when said signal is at said second value, said data received from said peripheral device port is directed to said interface output through the microprocessor.

41. An apparatus according to claim 20, wherein when said signal is at said second value, said data received from said peripheral device port is directed to said interface output through the microprocessor.

* * * * *

UNITED STATES PATENT AND TRADEMARK OFFICE
CERTIFICATE OF CORRECTION

PATENT NO. : 6,546,441 B1
DATED : April 8, 2003
INVENTOR(S) : Jackson Lum

It is certified that error appears in the above-identified patent and that said Letters Patent is hereby corrected as shown below:

Column 11,
Line 5, now reads "invnetion", should read -- invention --;

Column 12,
Line 3, now reads "3b", should read -- 30b --;

Column 13,
Line 22, now reads:
"second interface having a second value indicative of when there is no traffic on the serial connection between the computer and the peripheral input devices the computer being available for data communication with said third peripheral input device; and,"
should read:
-- second interface having a second value indicative of the computer being available for data communication with said third peripheral input device when there is no traffic on the serial connection between the computer and the peripheral input devices; and, --

Column 15,
Line 18, now reads "accordance to with", should read -- accordance with --.
Line 23, now reads:
"said signal having a second value indicative of then there is no traffic on the serial connection between the computer and the peripheral input devices the computer being available for data communication with said second peripheral input device; and,".
should read:
-- said signal having a second value indicative of the computer being available for data communication with said second peripheral input device when there is no traffic on the serial connection between the computer and the peripheral input devices and, --.

UNITED STATES PATENT AND TRADEMARK OFFICE
CERTIFICATE OF CORRECTION

PATENT NO. : 6,546,441 B1
DATED : April 8, 2003
INVENTOR(S) : Jackson Lum

It is certified that error appears in the above-identified patent and that said Letters Patent is hereby corrected as shown below:

<u>Column 18,</u>
Line 45, now reads "computer", should read -- computer keyboard --.

Signed and Sealed this

Fourth Day of November, 2003

JAMES E. ROGAN
*Director of the United States Patent and Trademark Office*